United States Patent [19]

Ivas

[11] 3,906,150

[45] Sept. 16, 1975

[54] GATE ACTUATED ON/OFF CONTROL FOR TELEVISION RECEIVERS

[75] Inventor: Thomas Wayne Ivas, Evergreen Park, Ill.

[73] Assignee: Quasar Electronics Corporation, Franklin Park, Ill.

[22] Filed: Dec. 15, 1972

[21] Appl. No.: 315,697

[52] U.S. Cl.......... 178/7.3 R; 178/DIG. 15; 325/395

[51] Int. Cl................................................ H04n 5/44

[58] Field of Search....... 178/7.3 R, 5.8 R, DIG. 15; 325/390–392, 395

[56] References Cited

UNITED STATES PATENTS

| | | | |
|---|---|---|---|
| 3,098,212 | 7/1963 | Creamer, Jr. | 325/393 |
| 3,218,388 | 11/1965 | Jobe et al | 178/5.8 R |
| 3,378,775 | 4/1968 | Joseph | 325/395 |
| 3,388,215 | 6/1968 | Mayle | 178/5.8 R |
| 3,478,270 | 11/1969 | Mayle et al. | 178/5.8 R |

*Primary Examiner*—Howard W. Britton
*Assistant Examiner*—Jin F. Ng
*Attorney, Agent, or Firm*—LaValle D. Ptak

[57] ABSTRACT

A gate actuated on/off control arrangement for a remotely-controlled television receiver is disclosed for maintaining the receiver in an operative condition includes circuitry for sensing in the presence of a derived synchronization signal functioning as a gating signal in conjunction with a derived vertical blanking signal serving as a control or command signal. The receiver is remotely turned off by programming the remote control channel selector to select a blank of unused channel which provides no synchronization and blanking signals, thereby allowing the receiver to turn off.

5 Claims, 2 Drawing Figures

GATE ACTUATED ON/OFF CONTROL FOR TELEVISION RECEIVERS

BACKGROUND OF THE INVENTION

This invention relates generally to remote control systems, and more particularly to an improved remote control turn-on/turn-off circuit arrangement for a television receiver, color or monochrome.

There are of course many applications wherein it is desirable to provide for the remote control of an electronic device. One such application is in a television receiver wherein it is desired to remotely select the television channel to be viewed and to remotely turn the television receiver on and off.

Several techniques for providing remote channel selection and a remote on/off function for television receivers are known. One such known technique utilizes ultrasonic sounders to provide ultrasonic acoustic signals for pick-up by transducers within the television set. The signals so received are then decoded within the television receiver to perform the desired functions. Customarily, appropriate ultrasonic sounder devices are used to provide a first ultrasonic signal for activating the channel selecting function and a second such ultrasonic signal having a frequency different from the frequency of the first ultrasonic signal to activate the on/-off function.

Another frequently used technique utilizes a single frequency sounder for stepping the channel selector sequentially through a series of preselected channels, and provides a mechanical switch coupled to the channel selector for turning off the receiver after the stepping sequence has been completed. Still another approach uses a single frequency sounder to step the channel selector through a preprogrammed sequence of television channels, including an unused channel having no television signals thereon. The receiver includes a provision for monitoring the automatic gain control voltage of the set and turning off the set when the unused channel, as indicated by the amplitude of automatic gain control voltage, is selected.

As might be surmised, the third technique is somewhat less complex than the first two. However, this is offset by the fact that the television set may turn off when relatively weak television signals that provide little or no automatic gain control voltage are being received. A better approach is to provide a detector device to sense the presence of synchronization signals that accompany a television broadcast and utilize the same to control an electrically controlled switch for energizing the receiver. A functional system of this type is set forth and described in a co-pending application, Ser. No. 225,404, filed Feb. 11, 1972 in behalf of Bernard Shlachter, and assigned to the same assignee as the present invention. However, even here some operational deficiencies may be encountered, such as in instances of strong spurious signal pick-up which may well impair proper operation. The referenced spurious signal information may be simply noise, or alternatively, the result of undesired regeneration within ther receiver arising because of close proximity of signal leads with one another or to other circuit components. In any event, if the spurious signal amplitude is sufficient, the receiver set may well be maintained in the "on" condition notwithstanding there is no sync information present -- an undesirable situation.

SUMMARY OF THE INVENTION

Accordingly, it is an object of the present invention to provide an improved turn-on/turn-off system for a remotely-controlled television receiver without mechanical switches or ultrasonic sounder devices.

It is another object of this invention to provide an on/off function of the foregoing type for a remotely-controlled television receiver that combines lower cost and greater reliability and performance than was heretofore obtainable.

It is a further object of the invention to provide an automatic shut-off system for a television receiver that automatically turns off the receiver upon termination of the television signal being received.

A still further object of this invention is to provide an on/off function for a remotely-controlled television receiver that does not falsely turn-off in the presence of weak television signals nor remain in the "on" condition because of spurious signal pick-up.

In accordance with a particular embodiment of the invention, a synchronization signal detector is employed to detect the synchronization signals that accompany television broadcast signals. An electrically controlled switch when actuated enables the receiver to be energized. The switch is actuated when, and only when, sync information is detected during the time a further signal in time coincidence therewith is developed, such as a vertical blanking pulse as obtained from the deflection yoke through suitable limiting impedance. In this way, spurious signal pick-up, that may otherwise result in false operation is effectively avoided.

Accordingly, the remotely-controlled channel selector is programmed to select channels having television signals present thereon and an least one channel that is unused and has no television signals present. Selection of the unused channel by the remotely-controlled channel selector eliminates both the synchronization pulses being detected and the vertical blanking signal, which in turn causes the electronically controlled switch to turn "off" the receiver, thereby effecting a turn-off function whenever an unused channel is selected. In a similar fashion, when a television broadcast is terminated, the absence of synchronization and blanking signals is detected and the receiver is automatically turned off.

DETAILED DESCRIPTION

Figure 1:
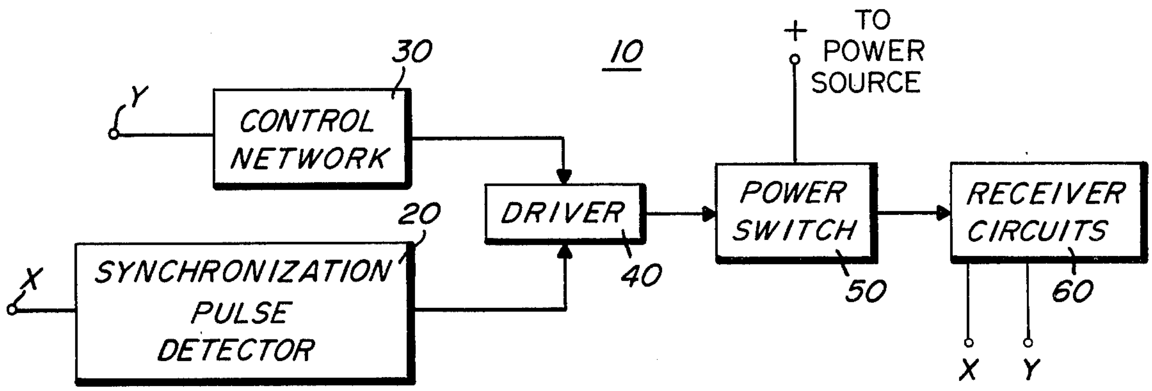
FIG. 1 is a simplified block diagram illustrating the principle operation of the remote control turn-off system according to the invention.

Referring now to the drawings, a gate actuated on/off control circuit arrangement 10 suitable for television receivers is shown which circuit 10 has been constructed in accordance with the present invention. In the embodiment shown, circuit 10 includes synchronization signal sensing means in the form of a detector 20 interconnected between an input point "X" and a driver 40. Driver 40 is further connected to a power switch 50 interposed between a source of power (not shown) and a receiver 60 to be energized by such power source. Driver 40 and power switch 50 provide a switching means for energizing and de-energizing the receiver. Synchronization signals, for example, vertical synchronization signals, are applied to synchronization detector 20 at input point X. The referenced synchronization signals may be obtained at an included synchronization separator (not shown), or at any convenient point, in the television receiver. Synchronization detector 20 provides one part of the control or input signal as applied to driver 40 to effect energization of power switch 50 and in turn, receiver 60. The other portion of input signal information necessary to selectively control the action of driver 40 is provided by a control or command pulse such as from a source or network identified at 30. This command signal may be a vertical blanking pulse such as may be developed by tapping into the deflection yoke (not shown) and couled to terminal or input point "Y". In any event, driver 40 is designed so that both the blanking signals from source 30 and the synchronization signals from detector 20 are required to effect proper actuation of driver 40. Either signal information by itself is not sufficient. In this way, spurious signal pick-up including noise as well as that due to regeneration within the receiver itself will not effect false operation, such as keeping the receiver in the on condition despite an absence of synchronization and blanking pulses.

Figure 2:
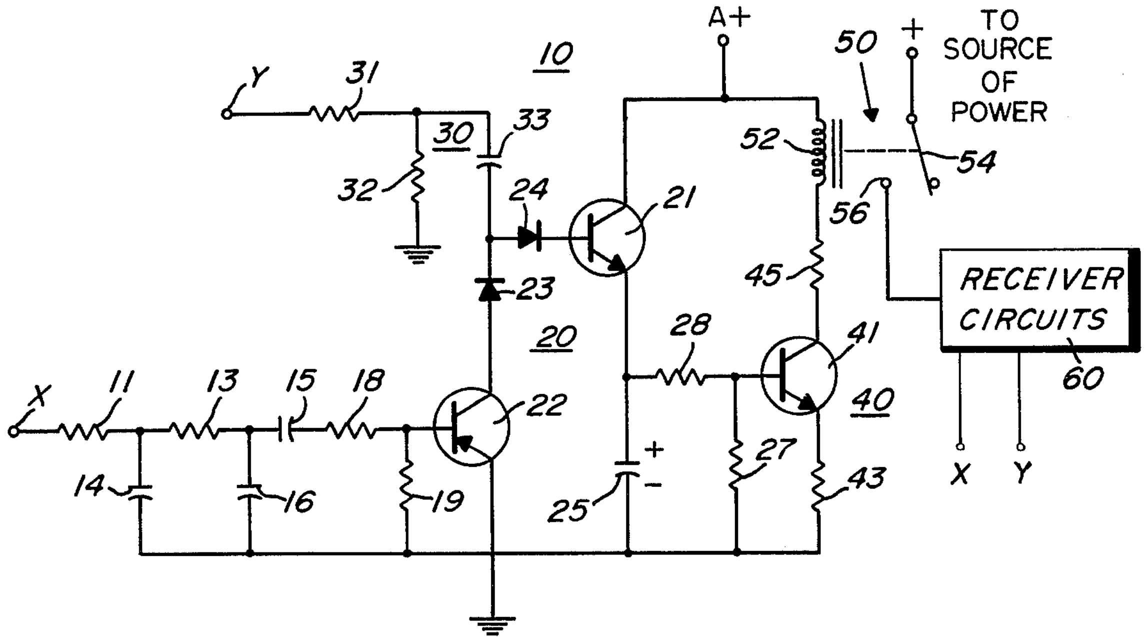
FIG. 2 is a detailed circuit diagram of one embodiment of the remote control turn-off system according to the invention.

A typical remote control system is shown diagramically in FIG. 3. As indicated, the system includes a transmitter device RCT which generates an ultrasonic or electromagnetic signal, which in turn is picked up by the remote control receiver RCR included in a television set T. A suitable signal S is generated and applied to, and which selectively controls, a programmable tuner PT. The tuner then applies the received signal information to the remainder of the television receiver circuits, identified generally at 60, for suitable translation and display. The remote system as depicted in FIG. 3 is entirely conventional in operation such that further and more detailed description is deemed unnecessary As will be appreciated, the on/off control circuit 10 of FIG. 1 is shown in schematic detail in FIG. 2. As indicated, synchronization detector 20 comprises transistor 22, diode 23 and 24, and an integration circuit comprising resistors 11, 13 and capacitors 14, 16. Circuitwise, the base of transistor 21 in driver 40 is coupled to the terminal input point X through the series combination of resistors 11, 13, a capacitor 15, a resistance 18, the base-collector junctions of transistor 22, and diodes 23 and 24. Capacitor 14 is connected between the junction formed by resistors 11, 13 and a plane of reference potential or ground. Capacitor 16 is coupled between ground and the junction of resistor 13 and capacitor 15 with a further resistor 19 being connected between the base of transistor 22 and ground. Diodes 23 and 24 are serially connected between the base of transistor 21 and the collector of transistor 22, with the cathode of diode 24 being connected to the base of transistor 21 and the anode oof diode 23 being connected to the collector of transistor 22. The emitter of transistor 22 is returned directly to ground. As indicated, the second input point identified at Y is likewise coupled to the base input of transistor 21 through diode 24 and series connected resistor 31 and capacitor 33. A resistor 32 is connected from their junction to ground. The collector of transistor 21 is connected to a source of operating potential while its emitter is coupled to a network having a capacitor 25 in one leg with resistors 28 and 27 in the other leg.

The driver stage 40 comprises, in this embodiment, the transistor 21, a transistor 41 and resistors 43 and 45 having terminals connected to the emitter and collector electrodes thereof, respectively. The remaining terminal of resistor 45 is connected through a coil 52 of the relay comprising power switch 50. The other terminal of resistor 43 is connected to ground. Relay 50 includes a contact 56 and an armature 54 which is magnetically coupled to coil 52 and is brought into engagement with contact 56 whenever coil 52 is energized. Spring biasing means (not shown) may be employed to disengage the contacts when the coil 52 is not energized. Armature 54 and contact 56 form a set of contacts which are connected between the source of power and the receiver 60 to be energized.

In operation, synchronization signal from a convenient point in the associated television receiver is applied to terminal input point X. The synchronization signal includes vertical synchronization pulses and may also include horizontal synchronization pulses which appear as serrations on the vertical synchronization pulses. In this embodiment, resistor 11, 13 and capacitors 14, 16 form a pair of integrators which effectively attenuate the horizontal synchronization pulses and pass the vertical synchronization pulses through capacitor 15 and resistance 18 to the base of the *p-n-p* transistor 22. Upon sufficient negative voltage applied to its base, transistor 22 will conduct, thereby connecting the anode of diode 23 to ground through the collector-emitter circuit of transistor 22. Accordingly, upon the application of a vertical blanking pulse to input terminal point Y during the time transistor 22 is conductive, diode 23 is effective to clamp the negative peak of the blanking pulse to ground and permit the positive peak thereof to drive transistor 21 into conduction through diode 24. Thus in the absence of either the vertical blanking pulses at point Y or the synchronization pulses at point X, transistor 21 remains effectively cutoff and keep the television receiver de-energized. It is important to note that the referenced vertical blanking and synchronization pulses must be in time coincidence in order that transistor 21 be driven into conduction and permit the television receiver to be turned on. As a result, false operation due to spurious signal pick-up is essentially and effectively avoided.

In any event, when transistor 21 is turned on by the coinciding vertical blanking and synchronization pulses applied, respectively, to input terminal points X and Y, current can then flow from the power supply A+ through the collector-emitter circuit of transistor 21 and into capacitor 25, thereby charging the latter to a positive voltage. The voltage appearing across capacitor 25 is then coupled through the voltage divider network comprising resistor 28 and 27 to the base of transistor 41 thereby biasing the same to a conductive state and allowing current to flow from the power supply A+ through the series combination of coil 52 of relay 50, current limiting resistor 45, transistor 41 and resistor 43 to ground. The flow of current through coil 52 is effective to cause armature 54 to be attracted to coil 52 and brings armature 54 into engagement with contact point 56 so as to complete the circuit between the power source and the receiver 60 to be powered thereby.

When the circuit of the instant invention is used to provide an on/off function for a remote control television set, the channel selector is programmed to select predetermined channels for viewing and at least one blank or unused channel on which no television signals are broadcast. When the television receiver 60 is operated in its remote control mode, selection of any channel having a television signal appearing on it will cause vertical blanking and synchronization pulses to be generated by the circuit for turning on the receiver. When the user desires to turn off the television receiver, he selects the channel on which no television signals are being broadcast. When the blank channel is thus selected, the reference pulses are not generated, relay 50 is not energized, the circuit between the power source and the receiver 60 is opened, and the receiver is turned off.

When the receiver 60 is in the process of being tuned, either manually or remotely, no vertical blanking or synchronization pulses are present when the channel selector is between channels. To prevent the receiver from being turned off under these conditions, an appropriate time delay is presented by the time constant of capacitor 25 and resistors 26–27 to maintain transistor 41 in the conductive state and the receiver set will remain on even though the channel selector is between channels.

Another feature of the instant invention is the provision of an automatic turn-off function when the signal being received goes off the air. This feature automatically turns off the receiver at the termination of the television transmission, thereby preventing the receiver from operating all night in the event that the viewer has fallen asleep or is otherwise not paying attention to the receiver. The automatic turn-off function is provided by the same circuitry that provides the remote turn-off function and is inherent therein because the circuit requires the presence of synchronization signals from a television broadcast to maintain the set operative.

The following component values for the illustrated circuitry have been found to provide satisfactory operation in accordance with the invention. It is to be understood, however, that as such they are intended only by way of illustration and not as limitations:

| | | |
|---|---|---|
| Transistors 21, 41 | type | 2N5210 |
| Transistor 22 | type | Motorola MPS6518 |
| Diodes 23, 24 | type | 1N914 |
| Resistance 11 | ohms | 56,000 |
| Resistance 13 | ohms | 150,000 |
| Resistance 18 | ohms | 39,000 |
| Resistance 19, 26 | ohms | 12,000 |
| Resistance 27 | ohms | 10,000 |
| Resistance 31 | ohms | 100,000 |
| Resistance 32 | ohms | 5,600 |
| Resistance 43 | ohms | 100 |
| Resistance 45 | ohms | 470 |
| Capacitance 14 | picofarads | 1,000 |
| Capacitance 15 | picofarads | 2,000 |
| Capacitance 16 | picofarads | 4,700 |
| Capacitance 25 | microfarads | 100 |
| Capacitance 33 | microfarads | 0.1 |

In summary, the techniques of the instant invention provide a way to achieve a turn-off function for a remotely-controlled receiver that is less costly and provides improved performance over systems heretofore obtainable. In addition, the circuit provides an automatic turn-off of the receiver that automatically turns off the receiver when the television signal being received is terminated at the end of the broadcast day and is impervious to spurious signal generation and/or pick-up which may otherwise give rise to false operation.

What is claimed is:

1. A receiver turn-off system for a television receiver comprising, synchronization signal sensing means for sensing the presence of vertical synchronization signals associated with television broadcast signals and providing a first control signal in response thereto, means for sensing the presence of vertical blanking signals within the receiver and providing a second control signal in response thereto, said first and second control signals being in time coincidence with one another, and switch means coupled with said synchronization signal sensing means, and said means for sensing the presence of vertical blanking signals responsive to time coincidence of said first and second control signals for de-energizing said receiver in the absence of said either of said control signals.

2. A system as recited in claim 1 further including means for maintaining said receiver operative for a predetermined time period after either of said control signals become absent.

3. A system as recited in claim 1 wherein said sensing means for sensing synchronization signals includes transistorized detector means, said means for sensing vertical blanking signals includes voltage divider means coupled for receipt of vertical blanking signals, and said switch means includes relay means having contact means connected to the television receiver for interrupting the power supplied thereto.

4. A method of turning off a television receiver, comprising the steps of; programming said receiver to select at least one channel having television signals broadcast thereon and at least another channel having no television signals thereon, electronically detecting television synchronization signals within said receiver and providing a first control signal in response thereto, sensing the presence of vertical blanking pulses within the receiver and providing a second control signal in response thereto, said first and second control signals being in time coincidence and together being indicative of the receipt of a television signal by said receiver, selecting the channel having no television signals thereon, and electronically turning off said receiver in response to the absence of either or both of said control signals occurring upon selection of said channel having no television signals thereon.

5. The method recited in claim 4 wherein the step of detecting synchronization signals includes the step of electronically detecting vertical synchronization signals.

* * * * *

UNITED STATES PATENT AND TRADEMARK OFFICE
CERTIFICATE OF CORRECTION

PATENT NO. : 3,906,150

DATED : September 16, 1975

INVENTOR(S) : Thomas Wayne Ivas

It is certified that error appears in the above-identified patent and that said Letters Patent are hereby corrected as shown below:

In the ABSTRACT, at line 9, "of" should be changed to --or--.

Signed and Sealed this

*ninth* Day of *December 1975*

[SEAL]

*Attest:*

RUTH C. MASON
*Attesting Officer*

C. MARSHALL DANN
*Commissioner of Patents and Trademarks*